United States Patent [19]

Diefenbach et al.

[11] Patent Number: 5,032,429
[45] Date of Patent: Jul. 16, 1991

[54] METHOD OF PRODUCING LUMINOUS DECORATIONS

[75] Inventors: Fritz Diefenbach, Alsbach-Haehnlein; Helmut Scholtis, Hanau; Kai Dorer, Heusenstamm, all of Fed. Rep. of Germany

[73] Assignee: Degussa Aktiengesellschaft, Frankfurt am Main, Fed. Rep. of Germany

[21] Appl. No.: 418,488

[22] Filed: Oct. 10, 1989

[30] Foreign Application Priority Data

Oct. 18, 1988 [DE] Fed. Rep. of Germany ....... 3835402

[51] Int. Cl.$^5$ .............................................. B05D 5/06
[52] U.S. Cl. .................. 427/215; 427/376.2; 427/383.5; 427/397.7; 427/419.6; 428/324; 428/403; 428/433; 428/434; 428/689; 428/702
[58] Field of Search ................. 427/215, 376.2, 383.5, 427/397.7, 419.6; 428/324, 403, 433, 434, 689, 690, 702

[56] References Cited

U.S. PATENT DOCUMENTS

| | | | |
|---|---|---|---|
| 2,663,658 | 12/1955 | Schurecht | 427/376.2 |
| 3,018,191 | 1/1962 | Caban et al. | 427/376.2 |
| 3,060,610 | 10/1962 | Stangl | 428/434 |
| 3,087,828 | 4/1963 | Linton | 106/446 |
| 4,720,438 | 1/1988 | Watanabe et al. | 427/376.2 |
| 4,748,071 | 5/1988 | Wild et al. | 428/434 |

FOREIGN PATENT DOCUMENTS

| | | | |
|---|---|---|---|
| 57-1500 | 1/1982 | Japan | 428/434 |
| 60-169574 | 9/1985 | Japan | 427/376.2 |

Primary Examiner—Shrive Beck
Assistant Examiner—Terry J. Owens
Attorney, Agent, or Firm—Beveridge, DeGrandi & Weilacher

[57] ABSTRACT

A method of producing luminous, wear-resistant decorations on ceramic or silicate bases is disclosed. A luster metal preparation or a precious metal preparation is first coated onto the base material. A decorative color preparation is then coated onto the luster metal or precious metal coated base. The decorative color preparation includes a mixture of a glass flux combined with mica platelets, wherein the mica platelets are provided with a thin coating of a metallic oxide. The metallic oxide may be light-impermeable or light permeable. The luster metal or precious metal coating may be stoved prior to the coating with the decorative color, or the luster metal or precious metal coating and the decorative coating may be stoved simultaneously. The stoving takes place at a temperature in the range of 500° to 1100° C. One alternative embodiment of the invention includes forming the luster or precious metal coatings and the decorative color preparations on a decal release paper, and then transferring the decal to the base. Another alternative embodiment includes coating with the decorative color preparation before coating with the luster or precious metal.

13 Claims, No Drawings

METHOD OF PRODUCING LUMINOUS DECORATIONS

BACKGROUND OF THE INVENTION

The invention relates to a method of producing luminous decorations with good wear resistance on ceramics and silicate bases, such as porcelain, stoneware, pottery, enamel or glass. The decorations are produced by means of stoving or baking with decorative colors (vitrifiable colors, overglaze colors), lustring preparations and noble-metal preparations.

Decorative colors as well as lustring and noble-metal preparations are widely used for the decoration of ceramic and silicate surfaces. They are described e.g. in "Ullmanns Enzyklopädie der technischen Chemi", vol. 17 (1977) under the entry "Keramische Farben" (Ceramic Colors). The term "decorative colors" denotes vitrifiable colors and overglaze colors.

It is difficult to incorporate decorative colors along with lustring and noble-metal preparations into a decoration, since few of the metallic elements contained in the lustring and noble-metal preparations react with the decorative colors during stoving to produce heavily colored products. For example, gold brings about an intensive violet coloration and silver brings about a discoloration tending toward yellowish brown. In addition to the discoloration at the contact areas between decorative colors and the lustring or noble-metal preparations, most decorative colors suffer because of their transparency. There is a considerable loss of their luminosity as a result of the dark color of the lustring or noble-metal layers under them.

DE-OS 29 45 288 teaches the application of heat-transferring silicate coatings onto heat-resistant ceramic objects. The silicate coatings comprise an enamel to which at least 10% by weight mica particles coated with titanium dioxide has been added. However, these enamels are not used to produce luminous decorations in cooperation with lustring and noble-metal preparations.

SUMMARY OF THE INVENTION

One objective of this invention is to develop a method of producing luminous decorations with a good wear resistance on ceramics and silicate bases, such as porcelain, stoneware, pottery, enamel or glass. This is accomplished by means of stoving or baking decorative colors with lustring and noble-metal preparations in which no disturbing discolorations occur during stoving.

The invention solves the above-mentioned problems in that a mica platelet preparation is used as the decorative color, wherein the mica platelets are coated with a thin, light-impermeable or light-permeable coating of a metallic oxide. The decorative color and the lustring and noble-metal preparation are stoved individually or together at 500 to 1100° C.

Accordingly, a feature of the invention resides in a method of producing wear resistant luminous decorations on ceramic or silicate bases including, broadly, the steps of mixing a glass flux and a mica platelet preparation to form a decorative color, wherein the mica platelets are coated with a thin, light-impermeable coating or a light permeable-coating of a metallic oxide, and stoving or baking the decorative color with a lustring or a noble-metal preparation, or mixture thereof, at a temperature in the range of 500 to 1100° C.

Typically, the ceramic or silicate bases can vary widely and include porcelain, stoneware, pottery, enamel and glass.

In carrying out the method of producing luminous decorations as set forth herein the stoving of the decorative color and the lustring and noble-metal preparation can take place together or separately.

Titanium oxide or iron oxide are preferably used for coating the mica platelets.

It should be noted that the method according to the invention can be carried out in two distinct steps, wherein as the first step, the base is coated with a noble metal preparation, then as a second step the coated base has deposited thereon the mica platelet preparation, the glass flux and a solvent. The resulting coated base is then dried and subjected to elevated temperature.

As an alternative method, a decal procedure can be used, wherein as a first step, a noble metal preparation, the mica platelets and the glass flux are deposited as a releasable coating onto a decal paper. The paper containing the releasable coating is then transferred to the desired base. Thereafter, the paper is removed and the base is subjected to elevated temperature.

DETAILED DESCRIPTION OF THE PREFERRED EMBODIMENTS

Pigments with mica structure which are coated with titanium oxide or iron oxide or another metallic oxide can be processed into decorative colors. The decorative colors made in accordance with the invention are designated in this specification as metallic colors and interference colors.

Interference colors reflect a part of the light spectrum and transmit the remaining part of the light. The transmitted light is reflected back from a white glazing base and is recombined with the part of the spectrum reflected from the pigments, to again form white light. The interference colors appear as a colorless white; only when viewed from the side is weak iridescence visible.

On the other hand, if the transmitted light is absorbed on a dark glazing (black, cobalt-blue or brown) then interference color reflects in the color of the spectral part reflected by the pigment (red, golden yellow, green, blue or violet).

Metallic colors also reflect a part of the light spectrum, but they absorb the remainder. Therefore, they appear equally colored on light and dark glazings.

Mica as used herein in an all encompassing term for a class of naturally occurring minerals, all of which possess a scaly, plate-like crystal structure. The micas are formed of $(Si,Al)_2O_5$ layers that are coupled through Al-, Mg-Fe-atoms and additionally contain alkali metal and alkaline earth metal ions. Accordingly, the chemical composition of the micas is variable. Muscovite is a natural mica substance that is particularly advantageous for the preparation of interference colors. Additional examples of micas suitable for the invention are phlogopite and biotite.

As a result of the leaf-like structure of the mica pigments, the interference colors and metallic colors reflect the light preferably in one direction, similar to a polished metallic surface. Due to the different absorption behavior, the shade of these colors is considerably more intensive and luminous than that of the customary decorative colors.

These metallic and interference colors are surprisingly not discolored by lustring and noble-metal preparations, unlike customary decorative colors. This results in completely new possibilities for decorating on glass, enamel, stoneware, porcelain and other ceramic surfaces, which exhibit a previously unknown color intensity and a previously unknown color contrast.

In addition, these decorations are very stable against mechanical wear. Lustring and burnished-gold decorations would otherwise be scratched and destroyed with customary household scouring materials.

Mica platelets preferably coated with titanium dioxide, are used as light-permeable interference colors, and mica platelets coated with iron oxide are used as light-impermeable metallic colors.

Interference colors prepared from micas can be obtained from micas that are coated with substances other than $TiO_2$ and $Fe_2O_3$. For example, other metallic oxides can be used for the coating on the mica such as $ZrO_2$, $Al_2O_3$, $ZnO$, $Sb_2O_3$, $SiO_2$, $CuO$, $NiO$, $CoO$ and $Cr_2O_3$. Furthermore, a combination of such oxides is possible for the coating as well. Mica based interference colors and the preparation thereof is well known in the art; see U.S. Pat. No. 3,087,828, German Patent (DE-PS) 20 09 566 and EP-A 0 045 851. Also suitable for present purposes is a layer of the above-mentioned metal oxides, especially $TiO_2$, $Fe_2O_3$, $TiO_2/Fe_2O_3$ on mica platelets, which additionally contain translucent metal layers, e.g. metal dots of the group Au, Ag, Cu, Pd, Co, as described in EP-A 0 313 281.

The following examples are intended to explain the method of the invention in more detail:

EXAMPLE 1

The surface area of a ceramic wall tile is coated with a burnished platinum preparation comprising a solution of platinum and gold resinates in terpene hydrocarbons (noble-metal content: 1.5% platinum, 7% gold) in stencil printing (polyester sieve fabric with 120 threads/cm). After drying, a paste is applied thereover, also in stencil printing (polyester fabric with 73 threads/cm). This paste comprises 25% by weight of an interference color of mica platelets of 30 μm average size coated with 0.05 μm titanium dioxide, 30% by weight of a glass flux, and 45% by weight of a stencil printing medium (85% pine oil and 15% by weight ethyl cellulose). The glass flux is comprised of 50% by weight PbO, 22% by weight $SiO_2$ 17% by weight $B_2O_3$, 6% by weight $Al_2O_3$ and 5% by weight $Na_2O$.

After having dried, the tile is stoved in a continuous furnace at 800° C. for 50 min. A decoration is obtained with a luminous green mottling on a base with a silver reflection. The decoration is not damaged by scratching with a knife and by scouring with scouring material.

This decoration is not possible with customary vitrifiable color because of a deficient covering power, and a yellowish green appears olive-colored on a dark base. Moreover, the green shade becomes extremely dirty by gold absorbed from the burnished platinum.

EXAMPLE 2

A porcelain plate is provided with a mottled decoration. Since a plate is not level, it is customarily decorated with a ceramic decal. To this end, a special paper is printed with a water-soluble layer of size in stencil printing in the following sequence. The necessary drying takes place after each printing process.

(a) Ruby luster comprising a solution of gold, silver and titanium resinate in terpene hydrocarbons (metal content: 2% Au, 2.5% Ag, 1% Ti), polyester fabric 165 threads/cm;

(b) Protective film comprising 70% by weight trimethylene benzene and 30% by weight polybutyl methacrylate polyester fabric 120 threads/cm;

(c) Mottling from a paste with 25% by weight of an interference pigment comprising 64% by weight muscovite (potassium aluminum silicate dihydrate, $K_2O \cdot 3Al_2O_3SiO_2 \cdot 2H_2O$) and 36% by weight titanium dioxide; 30% by weight of a glass flux analogous to Example 1; 45% by weight stencil printing medium comprising 37% by weight polybutyl methacrylate and 63% by weight butyl glycol acetate; with polyester fabric 73 threads/cm;

d) Film solution comprising 65% by weight trimethyl benzene and 35% by weight polybutyl methacrylate; polyester fabric 30 threads/cm.

The film layer with the decorative layers can be loosened from the paper and transferred onto the plate by watering this print. The decoration is stoved at 770° C. A luminous, steel-blue, mottled decoration on a transparent, ruby-red base is produced.

The special paper used herein is a conventional decal type paper produced for the production of ceramic decals. Any suitable commercially available ceramic decorative paper can be used for purposes of the invention.

In general, the resulting product is built up by using paper, a water soluble adhesive, one or more color layers or glaze layers and finally a polymeric cover layer.

EXAMPLE 3

A violet luster comprising a solution of gold and titanium resinate in terpene hydrocarbons (1.2% Au, 3% $TiO_2$) is printed with polyester fabric (165 threads/cm) onto a cosmetic bottle. A decorative and inscription block is applied thereover with a paste of 65% by weight of a metallic color for glass comprising a mica coated with iron oxide and a glass flux (75% $SiO_2$, 16% $B_2O_3$, 9% $Na_2O$) and 35% by weight of a stencil printing medium (13% by weight polybutyl methacrylate in 87% by weight pine oil) via a polyester fabric with 58 threads/cm. After the stoving at 580° C., the printer's mark and the inscription are present in dull gold on a violet base.

In addition to stencil printing, the metallic and interference colors can also be applied to luster and noble-metal preparations in a brush or spray application or in a transfer printing process.

The inverse application of interference and metallic colors first and luster over them also has interesting results.

A paste of 25% by weight interference pigment according to example 2, 30% by weight of a glass flux according to example 1 and 45% by weight stencil printing medium according to example 2 is applied first with a polyester fabric 73 threads/cm to a dark blue wall tile as a mottled decoration. An aurora luster is printed thereover which comprising a solution of iron an titanium naphthenates in terpene hydrocarbons with polyester fabric 165 threads/cm with a modified mottled pattern. The wall tile is stoved at 760° C.

In the area where only the interference color is present, it is a shiny steel-green. The luster itself stands out in a dark olive with a lustring effect against the dark blue glazing. In the area where the luster is located on the interference color, the steel-green shade is shifted to a yellowish green which is just as luminous.

The so-called noble metal preparations, in particular the lustrous noble metal preparations, contain noble metal in the form of organic compounds, such as the resinate or sulforesinate. These are known in the art and are provided as solutions in organic solvents such as aromatic and terpene hydrocarbons. Polymeric binders as known in the art can also be present. These preparations contain one or more of Au, Ag and the platinum group metals, particularly Pt, Rh, Ir, Pd. These preparations often also contain in addition Ti, Si, In, Bi, Sb, Fe, Cr, Sn in the form of their resinates. Noble metal content of these preparations in general is in the range of 6-20 weight %, see GB-A 2099760, DE-As 14 21 865 and DE-PS 38 19 414.

Luster preparations contain the color producing metals, which are the same as noted above, either singly or in combination with each other in the determined concentrations as in the noble metal preparations. As follows from the examples, the luster preparations can contain noble metals or can be free of noble metals. The metal concentration can typically range from 0.1 to 10% by weight. Luster preparations do not create any common composite metal film, unlike the noble metal preparations. The metals are introduced in the form of soluble organic compounds such as resinates, naphthenates, sulpresinates. Typical luster preparations noted in this regard are found in DE-As 22 52 813 and DE-PS 38 19 413.

While the invention has been described with reference to specific examples, various changes and modifications may be made without departing from the spirit and scope of the invention, as set forth in the appended claims.

We claim:

1. A method for producing a wear resistant luminous decoration on a ceramic or silicate base, comprising the steps of:
   coating the ceramic or silicate base with a luster or precious metal coating;
   coating the luster or precious metal coated base with a decorative color preparation comprising a glass flux and mica platelets, wherein said mica platelets are coated with a thin light-impermeable coating or a thin light permeable coating or a metallic oxide; and
   stoving the base having the luster of precious metal coating and the decorative color coating at a temperature in the range of about 500 to 1100° C.

2. A method of producing luminous decorations as defined in claim 1, wherein the ceramic or silicate base is chosen from the group consisting of: porcelain, stoneware, pottery, enamel and glass.

3. A method of producing luminous decorations as defined in claim 1, wherein the metallic oxide is iron oxide.

4. A method of producing luminous decorations as defined in claim 1, wherein the metallic oxide is titanium oxide.

5. A method of producing luminous decorations as defined in claim 1, wherein the mica platelets are coated with a light permeable coating.

6. A method of producing luminous decorations as defined in claim 1, wherein the mica platelets are coated with a light impermeable coating.

7. The method according to claim 1, wherein the luster or precious metal coated base is coated with the decorative color preparation by stencil printing.

8. The method according to claim 7, further comprising the step of drying the base having the luster or precious metal coating and the decorative color coating by subjecting said base to an elevated temperature prior to the stoving step.

9. A method for producing a wear resistant luminous decoration on a ceramic or silicate base comprising the steps of:
   coating a release paper with a luster or precious metal coating;
   coating the luster or precious metal coated release paper with a decorative color preparation comprising a glass flux and mica platelets, wherein said mica platelets are coated with a thin light-impermeable coating or a thin light permeable coating of a metallic oxide;
   transferring the paper including the coatings to the ceramic or silicate base;
   removing the paper; and
   stoving the base with the luster or precious metal coating and the decorative color coating to an elevated temperature.

10. A method for producing a wear resistant luminous decoration on a ceramic or silicate base comprising the steps of:
    coating the ceramic or silicate base with a decorative color preparation comprising a glass flux and mica platelets, wherein said mica platelets are coated with a thin light-impermeable coating or a thin light-permeable coating of a metallic oxide;
    coating the decorative color coated base with a luster or precious metal coating; and
    stoving the base having the decorative color coating and the luster or precious metal coating at a temperature in the range of about 500 to 1100° C.

11. The method according to claim 10, wherein the ceramic or silicate base is coated with the decorative color preparation by stencil printing.

12. A method for producing a wear resistant luminous decoration on a ceramic or silicate base, comprising the steps of:
    coating the ceramic or silicate base with a luster or precious metal coating;
    stoving the base having the luster or precious metal coating at a temperature in the range of 500 to 1100° C.;
    coating the stoved base with a decorative color preparation comprising a glass flux and mica platelets, wherein said mica platelets are coated with a thin light-impermeable coating or a thin light permeable coating of a metallic oxide; and
    stoving the decorative color coated based at a temperature in the range of about 500 to 1100° C.

13. A method for producing a wear resistant luminous decoration on a ceramic or silicate base comprising the steps of:
    coating the ceramic or silicate base with a decorative color preparation comprising a glass flux and mica platelets, wherein said mica platelets are coated with a thin light-impermeable coating or a thin light-permeable coating of a metallic oxide, thereby producing a decorative color coated base;
    stoving the decorative color coated base at a temperature in the range of 500 to 1100° C.;
    coating the stoved base with a luster or precious metal coating; and
    stoving the base having the luster or precious metal coating at a temperature in the range of about 500 to 1100° C.

* * * * *